(12) United States Patent
Okubo

(10) Patent No.: US 9,490,703 B2
(45) Date of Patent: Nov. 8, 2016

(54) POWER SUPPLY WITH FIRST AND SECOND CAPACITOR SECTIONS IN THE TRANSFORMER SECONDARY

(71) Applicant: DENSO CORPORATION, Kariya, Aichi-pref. (JP)

(72) Inventor: Takuya Okubo, Kariya (JP)

(73) Assignee: DENSO CORPORATION, Kariya (JP)

( * ) Notice: Subject to any disclaimer, the term of this patent is extended or adjusted under 35 U.S.C. 154(b) by 218 days.

(21) Appl. No.: 14/256,026

(22) Filed: Apr. 18, 2014

(65) Prior Publication Data

US 2014/0313788 A1    Oct. 23, 2014

(30) Foreign Application Priority Data

Apr. 18, 2013  (JP) .................. 2013-087592

(51) Int. Cl.
*H02M 3/335* (2006.01)
*H02M 3/28* (2006.01)
*H02M 1/12* (2006.01)
*H02M 1/34* (2007.01)

(52) U.S. Cl.
CPC .............. *H02M 3/28* (2013.01); *H02M 1/12* (2013.01); *H02M 3/335* (2013.01); *H02M 2001/346* (2013.01)

(58) Field of Classification Search
CPC .......... H02M 2001/346; H02M 1/34; H02M 3/335; H02M 3/33523; H02M 3/33507
See application file for complete search history.

(56) References Cited

U.S. PATENT DOCUMENTS

| 5,608,613 A | 3/1997 | Jansen |
| 6,055,162 A * | 4/2000 | Tarrillo ............. H02M 3/33576 363/133 |
| 6,101,107 A * | 8/2000 | Assow .................... H02M 1/34 363/126 |
| 2002/0075698 A1 | 6/2002 | Kuranuki et al. |
| 2007/0171680 A1* | 7/2007 | Perreault ................. H02M 1/34 363/16 |
| 2010/0052631 A1* | 3/2010 | Wu .................... H02M 3/33523 323/266 |
| 2013/0272031 A1* | 10/2013 | Hosotani ........... H02M 3/33569 363/16 |

FOREIGN PATENT DOCUMENTS

| JP | 09-107676 | 4/1997 |
| JP | 2002-209383 | 7/2002 |
| JP | 2008-187801 | 8/2008 |

OTHER PUBLICATIONS

Office Action (2 pages) dated Mar. 10, 2015, issued in corresponding Japanese Application No. 2013-087592 and English translation (2 pages).

* cited by examiner

*Primary Examiner* — Harry Behm
(74) *Attorney, Agent, or Firm* — Nixon & Vanderhye PC

(57) ABSTRACT

A power supply device includes a substrate, a transformer, a rectifying section, a filtering section, at least one first capacitor section, and a second capacitor section. The substrate includes at least one semiconductor element. The transformer inputs an electric power via at least one pair of primary-side terminals, transforms the input electric power, and outputs the transformed electric power via at least one pair of secondary-side terminals. The rectifying section includes at least one rectifying element configured to rectify the transformed electric power. The filtering section reduces alternating-current components included in the rectified electric power. The first capacitor section is connected in parallel to the at least one rectifying element. The second capacitor section generates one or more harmonic waves that reduce a peak value of a fundamental wave of resonance generated based on a leakage inductance component of the transformer and a capacitance component of the first capacitor section.

14 Claims, 10 Drawing Sheets

FIG.4
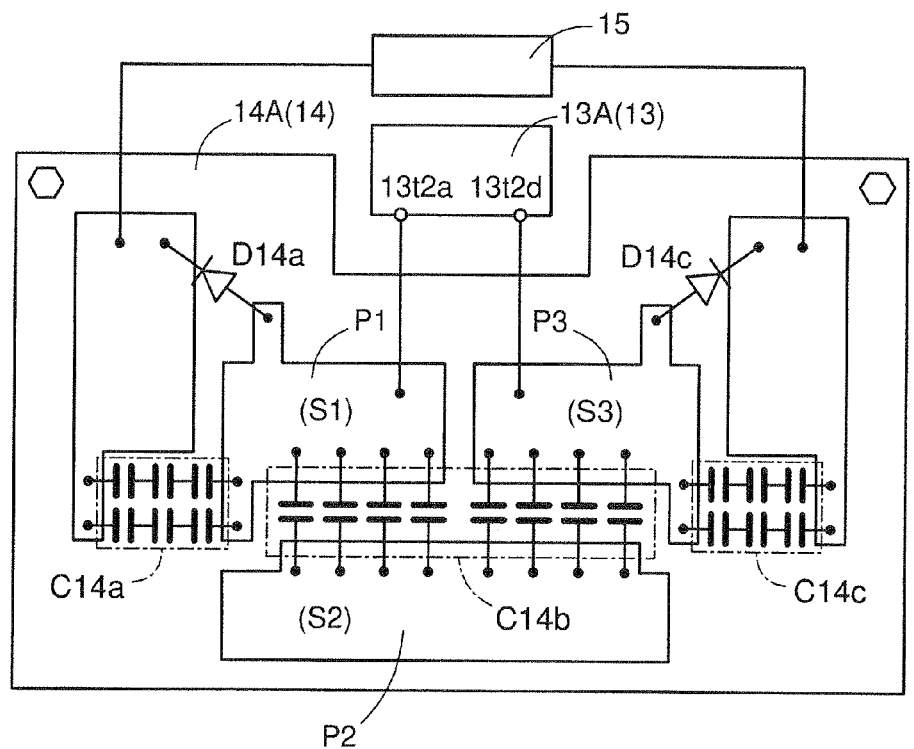
FIG.5A
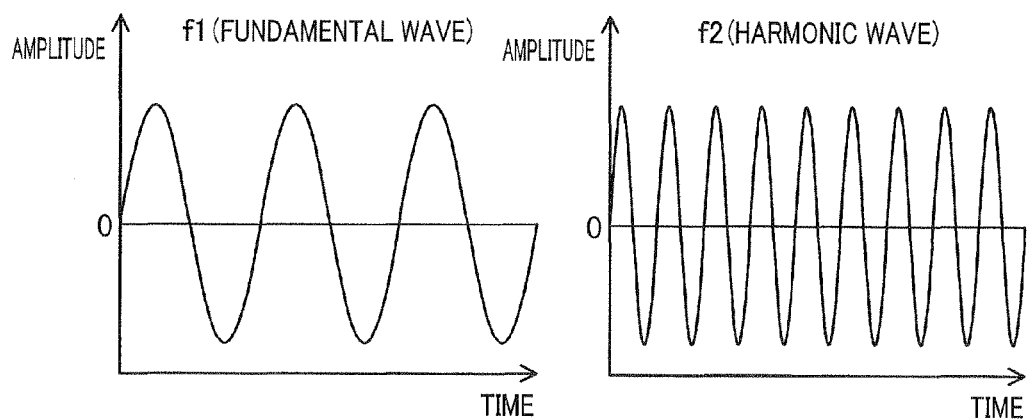
FIG.5B

POWER SUPPLY WITH FIRST AND SECOND CAPACITOR SECTIONS IN THE TRANSFORMER SECONDARY

CROSS-REFERENCE TO RELATED APPLICATION

This application is based on and claims the benefit of priority from Japanese Patent Application No. 2013-087592, filed Apr. 18, 2013, the disclosure of which is incorporated herein in its entirety by reference.

BACKGROUND

1. Technical Field

The present invention relates to a power supply device that includes a substrate, a transformer, a rectifying section, and a filtering section.

2. Related Art

An example of a technology related to switching power supply devices is disclosed (for example, refer to JP-A-2002-209383). An object of the technology is to reduce switching loss by soft switching and to reduce circulating current loss. The switching power supply device includes a snubber. The snubber is connected in parallel with a rectifying element. The rectifying element is connected to a secondary side of a transformer. The snubber includes a snubber capacitor. A diode or a semiconductor switch element, such as an insulated-gate bipolar transistor (IGBT), is used as the rectifying element.

The snubber capacitor is connected in parallel with the rectifying element. As a result, surge voltage that is generated when the rectifying element is turned OFF can be suppressed. However, resonance is generated as a result of the leakage inductance component of the transformer and the capacitance component of the snubber capacitor. In accompaniment with the generation of resonance, the peak value (maximum value of amplitude; the same applies hereafter) of the surge voltage may exceed the rating of a circuit element.

To suppress the peak value of surge voltage, a method may be considered in which the capacitance of the snubber capacitor is increased. However, as the capacitance increases, problems occur such as increase in the current flowing to the snubber capacitor, increase in the amount of heat generated by the snubber capacitor, and reduced power efficiency.

SUMMARY

It is thus desired to provide a power supply device that is capable of suppressing the peak value of surge voltage without increasing the capacitance of a capacitor section (including the above-described snubber capacitor).

A first exemplary embodiment provides a power supply device that includes a substrate, a transformer, a rectifying section, a filtering section, at least one first capacitor section, and a second capacitor section. The substrate includes at least one semiconductor element. The transformer inputs an electric power via at least one pair of primary-side terminals, transforms the input electric power, and outputs the transformed electric power via at least one pair of secondary-side terminals. The rectifying section includes at least one rectifying element configured to rectify the transformed electric power. The filtering section reduces alternating-current components included in the rectified electric power. The at least one first capacitor section is connected in parallel to the at least one rectifying element. The second capacitor section generates one or more harmonic waves that reduce a peak value of a fundamental wave of resonance generated based on a leakage inductance component of the transformer and a capacitance component of the at least one first capacitor section.

As a result of this configuration, the second capacitor section generates one or more harmonic waves. The harmonic wave is combined with the fundamental wave. Therefore, the peak value of the composite wave (including surge voltage; the same applies hereafter) can be reduced. The second capacitor section is merely required to be provided separately from the first capacitor section. The respective capacitances of the first capacitor section and the second capacitor section are not required to be increased. Therefore, efficiency maintenance and improvement can be achieved. Heat generation in the first capacitor section and the second capacitor section can be suppressed.

A second exemplary embodiment provides a power supply device that includes a substrate, a transformer, a rectifying section, a filtering section, at least one first capacitor section, and a second capacitor section. The substrate includes at least one semiconductor element. The transformer inputs an electric power via at least one pair of primary-side terminals, transforms the input electric power, and outputs the transformed electric power via at least one pair of secondary-side terminals. The rectifying section includes at least one rectifying element configured to rectify the transformed electric power. The filtering section reduces alternating-current components. The at least one first capacitor section has first and second ends. The first end is connected between one of the at least one pair of secondary-side terminals of the transformer and the at least one rectifying element. The second end is connected to a common potential portion of the power supply device. The second capacitor section generates one or more harmonic waves that reduce a peak value of a fundamental wave of resonance generated based on a leakage inductance component of the transformer and a capacitance component of the at least one first capacitor section.

As a result of this configuration, the second capacitor section generates one or more harmonic waves. The harmonic wave is combined with the fundamental wave. Therefore, the peak value of the composite wave can be reduced. The second capacitor section is merely required to be provided separately from the first capacitor section. The respective capacitances of the first capacitor section and the second capacitor section are not required to be increased. Therefore, efficiency maintenance and improvement can be achieved. Heat generation in the first capacitor section and the second capacitor section can be suppressed.

The capacitance of the second capacitor section may be set such that a ratio of the frequency of the fundamental wave to the frequency of the harmonic wave is 1:n, where n is an integer of 2 or more.

As a result of this configuration, the fundament wave and the harmonic wave overlap and cancel each other. As a result, the peak value of the combined composite wave is also reduced. Therefore, the peak value of the surge voltage can be significantly reduced. Here, n may be set to any value as long as the value is an integer of 2 or more.

The "first capacitor section" and the "second capacitor section" may each be configured by a single capacitor. Alternatively, at least one of the "first capacitor section" and the "second capacitor section" may be configured by a plurality of capacitors. In an instance in which the "first capacitor section" and the "second capacitor section" are configured by a plurality of capacitors, the capacitors may be connected in parallel. Alternatively, the capacitors may be connected in series. Alternatively, the capacitors may be connected in a combination of serial and parallel connections.

The "rectifying section" may be configured by any circuit that is capable of rectifying alternating current to direct current. For example, a full-wave rectifying circuit, a half-wave rectifier circuit, and the like are applicable. The "rectifying element" in the rectifying section is also referred to as a rectifier. The rectifying element may be configured by any element that rectifies alternating current to direct current. For example, a diode, a transistor (including a field effect transistor [FET] and an IGBT), and the like are applicable.

BRIEF DESCRIPTION OF THE DRAWINGS

In the accompanying drawings:

FIG. 4 is a planar view of a configuration example of a rectifying section;

FIGS. 5A and 5B are time charts of an example of a fundamental wave and a harmonic wave;

DESCRIPTION OF THE EMBODIMENTS

Embodiments of the present invention will hereinafter be described with reference to the drawings. Unless explicitly stated, "to connect" means "to electrically connect". Each drawing shows elements required for describing the present invention. The drawings do not necessarily show all actual elements. When referring to directions such as up/down/right/left, the directions are with reference to the drawings. Successive reference numbers are described using "to". For example, "switching elements Q1 to Q3" means "switching elements Q1, Q2, and Q3".

First Embodiment

A first embodiment will be described with reference to FIG. 1 to FIG. 9.

Figure 1:
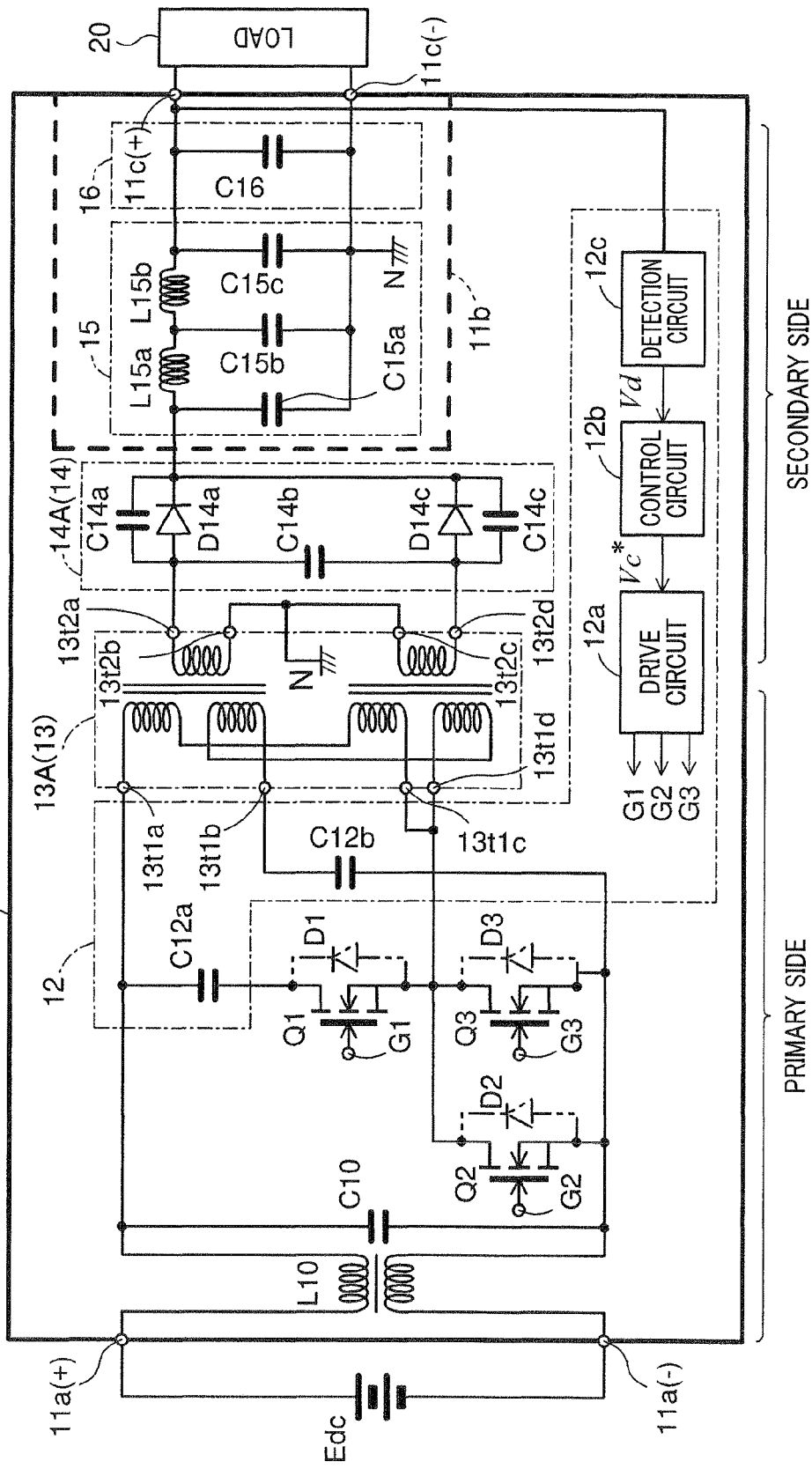
FIG. 1 is a circuit diagram schematically showing a first configuration example of a power supply device.

A power supply device 10 shown in FIG. 1 is a configuration example of a so-called "direct current-to-direct current (DC-DC) converter". The power supply device 10 converts power inputted from a power source Edc, via an input connector 11a. The power supply device 10 then outputs the converted power to a load 20, via an output connector 11c. The power supply device 10 includes a choke coil L10, a capacitor C10, switching elements Q1 to Q3, diodes D1 to D3, a substrate 12, a transformer 13 (hereinafter referred to as a transformer 13A in the first embodiment), a rectifying section 14 (hereinafter referred to as a rectifying section 14A in the first embodiment), a filtering section 15, an output stabilizing section 16, and the like. The switching elements Q1 to Q3, the diodes D1 to D3, and the like are equivalent to a power converting section (first configuration example) in terms of converting direct-current power to alternating-current power.

The power source Edc supplies the power supply device 10 with direct-current power. For example, a battery or a fuel cell is used as the power source Edc. The input connector 11a (+ terminal) is connected to the positive terminal of the power source Edc. The input connector 11a (+ terminal) is also connected to the primary-side terminal 13t1a of the transformer 13A with the choke coil L10 and the capacitor C10 therebetween. Meanwhile, the input connector 11a (− terminal) is connected to the negative terminal of the power source Edc. The input connector 11a (− terminal) is also connected to the primary-side terminal 13t1b of the transformer 13A with the choke coil L10 and the capacitor C12b therebetween. The choke coil L10 functions as an input filter. The capacitor C10 repeatedly performs charging and discharging of direct-current power.

The switching element Q1 is connected in series with the switching elements Q2 and Q3. The switching element Q2 and the switching element Q3 are connected in parallel. A connecting point of the source terminal of the switching element Q1 and the drain terminals of the switching elements Q2 and Q3 is connected to the primary-side terminals 13t1c and 13t1d of the transformer 13A. The diodes D1 to D3 indicated by the dashed double-dotted lines function as freewheeling diodes. The diodes D1 to D3 may be parasitic diodes of the corresponding switching elements Q1 to Q3. Alternatively, the diodes D1 to D3 may be diode elements and the like connected in parallel to the corresponding switching elements Q1 to Q3. The switching elements Q1 to Q3 are equivalent to the "semiconductor element". The diodes D1 to D3 are also equivalent to "semiconductor elements".

The capacitor 10 is connected between a terminal on one side of a capacitor C12a and the primary-side terminal 13t1a of the transformer 13A, and the source terminals of the switching elements Q2 and Q3 and a terminal on the other side of a capacitor C12b. A terminal on the one side of the capacitor C12b is connected to the primary-side terminal 13t1b of the transformer 13A. The capacitor C12a is connected between the terminal on the one side of the capacitor C10 and the primary-side terminal 13t1a of the transformer 13A, and the drain terminal of the switching element Q1. In addition, the respective terminals on the other side of the capacitor C10 and the capacitor C12b are commonly connected to the source terminals of the switching elements Q2 and Q3.

The substrate 12 includes the capacitors C12a and C12b, a drive circuit 12a, a control circuit 12b, a detection circuit 12c, and the like. The switching elements Q1 to Q3 are equivalent to the "semiconductor element". ON/OFF of individual switching elements Q1 to Q3 is controlled based on a drive signal (such as a pulse-width modulation [PWM] signal) that is transmitted from the drive circuit 12a to the corresponding control terminal G1 to G3.

The detection circuit 12c detects an output voltage (in other words, voltage Vd) at the output connector 11c (+ terminal). The control circuit 12b outputs a command signal Vc* for driving the drive circuit 12a such that the voltage Vd becomes a target voltage. The target voltage is recorded in advance in a recording medium within the control circuit 12b. Alternatively, the target voltage is inputted from an external device (such as an electronic control unit [ECU] or a computer, not shown). The drive circuit 12a generates a drive signal based on the command signal Vc*. The drive circuit 12a then individually outputs the generated drive signal in correspondence with the control terminals G1 to G3 of the switching elements Q1 to Q3.

The transformer 13A is an example of the transformer 13. The transformer 13A includes the primary-side terminals 13t1a to 12t1d on the input side and secondary-side terminals 13t2a to 13t2d on the output side. The secondary-side terminals 13t2a and 13t2d are connected to the rectifying section 14A. The secondary-side terminals 13t2b and 13t2c are connected to a common potential portion N. A filtering mechanism (in other words, the filtering section 15, the output stabilizing section 16, and the like) is connected between the rectifying section 14A and the output connector 11c (+ terminal).

The transformer 13A in the configuration shown in FIG. 1 performs a transformer operation and a reactor operation (magnetic energy amount conversion operation). The potential of the common potential portion N is not necessarily limited to 0[V]. The common potential portion N is grounded and the potential becomes 0[V].

The rectifying section 14A is an example of the rectifying section 14. The rectifying section 14A performs full-wave rectification of an alternating-current signal outputted from the secondary-side terminals of the transformer 13A. The rectifying section 14A according to the first embodiment includes diodes D14a and D14c, first capacitor sections C14a and C14c, a second capacitor section C14b, and the like. A configuration example of the rectifying section 14A including a substrate will be described hereafter (see FIG. 4).

The diodes D14a and D14c are both equivalent to a "rectifying element". In other words, the anode of the diode D14a is connected to the secondary-side terminal 13t2a. The anode of the diode D14b is connected to the secondary-side terminal 13t2d. The secondary-side terminal 13t2a is equivalent to "one end" of the transformer 13A. The secondary-side terminal 13t2d is equivalent to the "other end" of the transformer 13A. The cathodes of the diodes D14a and D14c are both connected to the filtering section 15. In other words, the cathodes of the diodes D14a and D14c are directly connected. Schottky barrier diodes are used as the diodes D14a and D14c according to the first embodiment.

The first capacitor section C14a is connected in parallel to the diode D14a. The first capacitor section 14c is connected in parallel to the diode D14c. In other words, the first capacitor section C14a is connected between the anode and the cathode of the diode D14a. The first capacitor section C14c is connected between the anode and the cathode of the diode D14c. Configuration examples of the first capacitor sections C14a and C14c will be described hereafter (see FIGS. 2A to 2C).

The second capacitor section C14b is connected between the secondary-side terminals 13t2a and 13t2d of the transformer 13A. The connection is also equivalent to connection between the anode of the diode D14a and the anode of the diode D14c. Configuration examples of the second capacitor section C14b will be described hereafter (see FIG. 3).

The filtering section 15 provides a function for reducing alternating-current components after rectification. The filtering section 15 includes coils L15a and L15b, capacitors C15a to C15c, and the like. Specifically, the coils L15a and L15b are connected in series between the rectifying section 14A and the output connector 11c (+ terminal). The capacitor C15a is connected between a connecting point of the rectifying section 14A and the coil L15a, and the common potential portion N and the output connector 11c (− terminal). The capacitor C15b is connected between the connecting point of the coil L15a and the coil L15b, and the common potential portion N and the output connector 11c (− terminal). The capacitor C15c is connected between the connecting point of the coil L15b and the output connector 11c (+ terminal), and the common potential portion N and the output connector 11c (− terminal).

The output stabilizing section 16 provides a function for suppressing pulsation of power (particularly voltage) accompanying rectification. The output stabilizing section 16 includes a single capacitor C16 or a plurality of capacitors C16, and the like. The capacitor C16 is connected to the output connector 11c (in other words, between the + terminal and the − terminal). The output connector 11c is connected to the load 20. As the load 20, any device, equipment, and the like that require power can be applied. For example, a battery of which the power supply capacity differs from that of the power source Edc, a control section (such as an ECU or a computer), a rotating machine (such as an electric motor, a power generator, an alternator, or a motor generator), and a system (including an electric power system) are applicable.

The above-described filtering section 15 and output stabilizing section 16 may be affected by noise (leakage inductance of the transformer 13A, external noise, and the like). In this instance, shielding is preferably provided by a shielding section 11b, indicated by the broken lines. Specifically, the shielding section 11b may be configured by an electromagnetic shield capable of reducing or blocking the effects of noise. In this case, the shielding section 11b may have any shape and any thickness, and may be made of any material. For example, a metal plate (including sheet metal), a metal mesh, a foamed metal, and the like are applicable. Alternatively, a front or back surface of a resin member that has been molded into a predetermined shape (such as a plate shape or a casing shape) may be plated with a metallic ink or a similar substance.

Figure 2A:
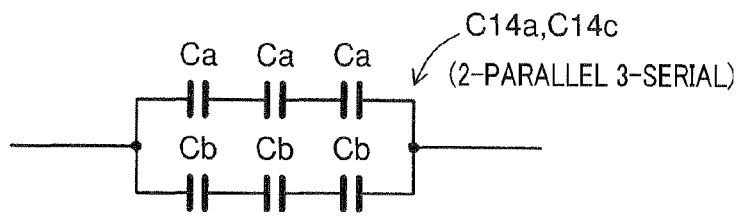
FIGS. 2A to 2C are circuit diagrams schematically showing configuration examples of a first capacitor section.
Figure 2B:
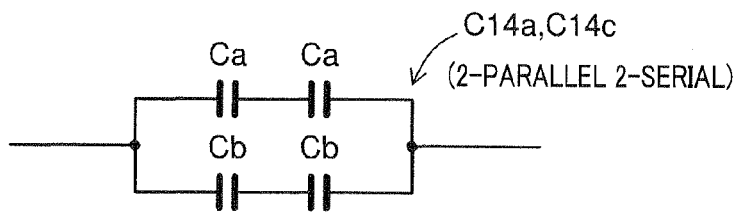
Figure 2C:
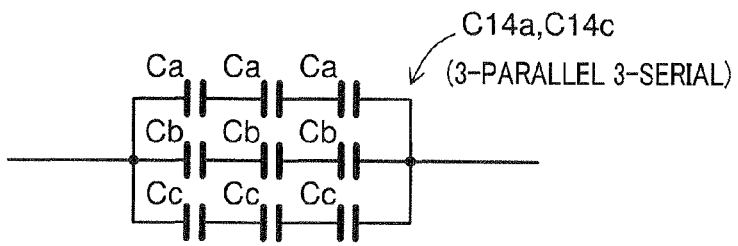

FIGS. 2A to 2C show three configuration examples of the first capacitor sections C14a and C14c.

FIG. 2A shows a "2-parallel 3-serial" configuration that is an example in which three capacitors Ca are connected in series. In addition, three capacitors Cb are connected in series. The serial connection composed of the capacitors Ca and the serial connection composed of the capacitors Cb are connected in parallel.

FIG. 2B shows a "2-parallel 2-serial" configuration that is an example in which two capacitors Ca are connected in series. In addition, two capacitors Cb are connected in series.

The serial connection composed of the capacitors Ca and the serial connection composed of the capacitors Cb are connected in parallel.

FIG. 2C shows a "3-parallel 3-serial" configuration that is an example in which three capacitors Ca are connected in series. In addition, three capacitors Cb are connected in series. Furthermore, three capacitors Cc are connected in series. The serial connection composed of the capacitors Ca, the serial connection composed of the capacitors Cb, and the serial connection composed of the capacitors Cc are connected in parallel. The first capacitor sections C14a and C14c may also be configured having a number of serial connections and a number of parallel connections other than those in FIGS. 2A to 2C.

Figure 3A:
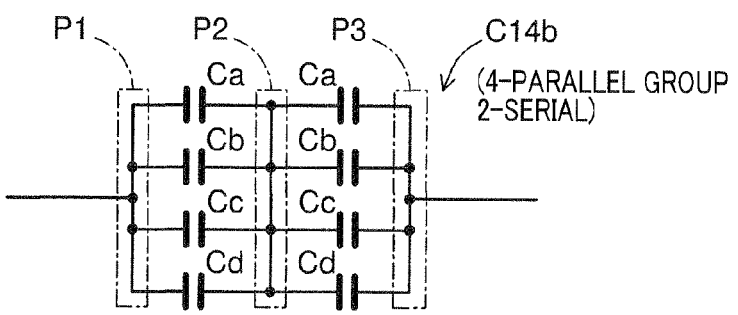
FIGS. 3A and 3B are circuit diagrams schematically showing configuration examples of a second capacitor section.
Figure 3B:
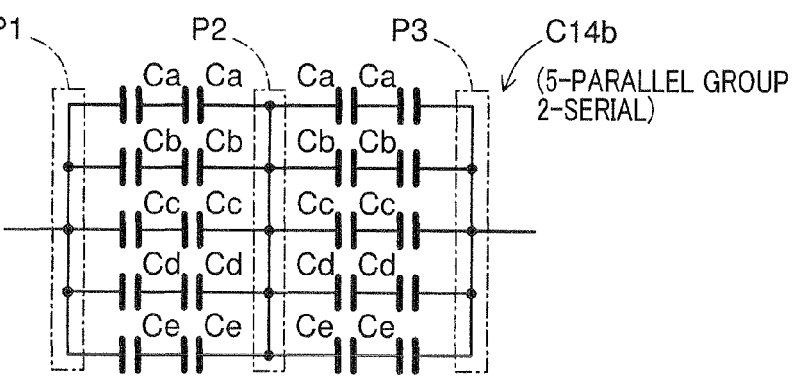

FIGS. 3A and 3B show two configuration examples of the second capacitor section C14b.

FIG. 3A shows a "4-parallel group 2-serial" configuration that is an example in which a parallel group is formed by capacitors Ca to Cd being connected in parallel. Two parallel groups are then connected in series.

FIG. 3B shows a "5-parallel group 2-serial" configuration that is an example in which two capacitors Ca are connected in series. Two capacitors Cb are connected in series. Two capacitors Cc are connected in series. Two capacitors Cd are connected in series. Two capacitors Ce are connected in series. A parallel group is formed by the serially connected capacitors Ca to Ce being connected in parallel. Two parallel groups are then connected in series.

As shown in FIGS. 3A and 3B, one end side of the second capacitor section C14b (left side in FIGS. 3A and 3B) is a non-interconnected portion P1. The other side (right side in FIGS. 3A and 3B) is a non-interconnected portion P3. An intermediate connecting portion between the parallel groups is an interconnected portion P2.

The capacitance of the capacitors Ca to Ce that are connected in series may be set such that the resonance frequency corresponds with an m-order harmonic wave (m being an integer that is 2 or more). The capacitance may be set such that the resonance frequency corresponds with a single harmonic wave. Alternatively, the capacitance may be set such that the resonance frequency corresponds with each of a plurality of harmonic waves that differ from each other. Hereafter, the capacitance is set such that the resonance frequency corresponds with a single harmonic wave (third-order harmonic wave f2 shown in FIG. 5B). Hereafter, an example is given in which the capacitance of the second capacitor section C14b is greater than that of the first capacitor sections C14a and C14c. The second capacitor section C14b may be configured having a number of serial connections and a number of parallel connections other than those in FIG. 3.

The rectifying section 14A shown in FIG. 4 is an example in which the rectifying section 14A is configured by the first capacitor sections C14a and C14c shown in FIG. 2A, and the second capacitor section C14b shown in FIG. 3A. Whereas current flows to the non-interconnected portions P1 and P3 per half-cycle, current flows to the interconnected portion P2 per full-cycle. As a result, the amount of generated heat is large. Therefore, a pattern area (S2) of the interconnected portion P2 that is greater than the pattern areas (S1 and S3) of the non-interconnected portions P1 and P3 (S2>S1 and S2>S3) is preferably secured. Thus, heat dissipation is facilitated by securing a large pattern area for the interconnected portion P1.

Next, operations of the second capacitor section C14b will be described with reference to FIGS. 5A, 5B, and 6 to 9. The second capacitor section C14b is connected between the anodes of the diodes D14a and D14c, separately from the first capacitor sections C14a and C14c. The first capacitor sections C14a and C14c are connected in parallel to the diodes D14a and D14c.

Some leakage inductance is present in the transformer 13A. Capacitance is naturally present in the first capacitor sections C14a and C14c. A signal (such as voltage or current) outputted from the transformer 13A resonates at a resonance frequency (f) based on the leakage inductance component (L) and the capacitance component (C). The resonance frequency (f) is as follows, when expressed by an equation.

$$f = 1/\{2\pi(LC)^{1/2}\}$$

Figure 6:
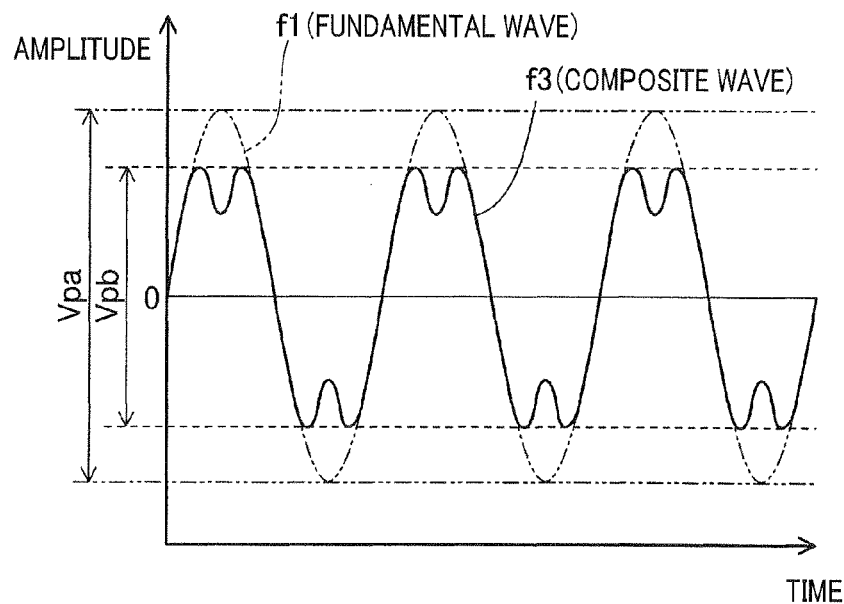
FIG. 6 is a time chart of an example of a composite wave (resonance frequency)

The waveform of the resonance frequency is equivalent to a fundamental wave (first-order harmonic wave). An example of a fundamental wave f1 is shown in FIG. 5A. To reduce the peak value of the fundamental wave f1, the fundamental wave f1 is overlapped and combined with the waveform of the m-order harmonic wave (m being an integer of 2 or more). An example of a third-order harmonic wave f2 is shown in FIG. 5B. For example, the third order harmonic wave f2 is a harmonic wave of when m=3. The relationship between the frequency of the fundamental wave f1 and the frequency of the third-order harmonic wave f2 is 1:3. When the fundamental wave f1 and the third-order harmonic wave f2 shown in FIG. 5B are combined, a composite wave f3 shown in FIG. 6 is formed. As is clear from FIG. 6, a peak value Vpb of the composite wave f3, indicated by the solid line, is less than a peak value Vpa of the fundamental wave f1, indicated by the dashed double-dotted line (Vpb<Vpa).

Figure 7:
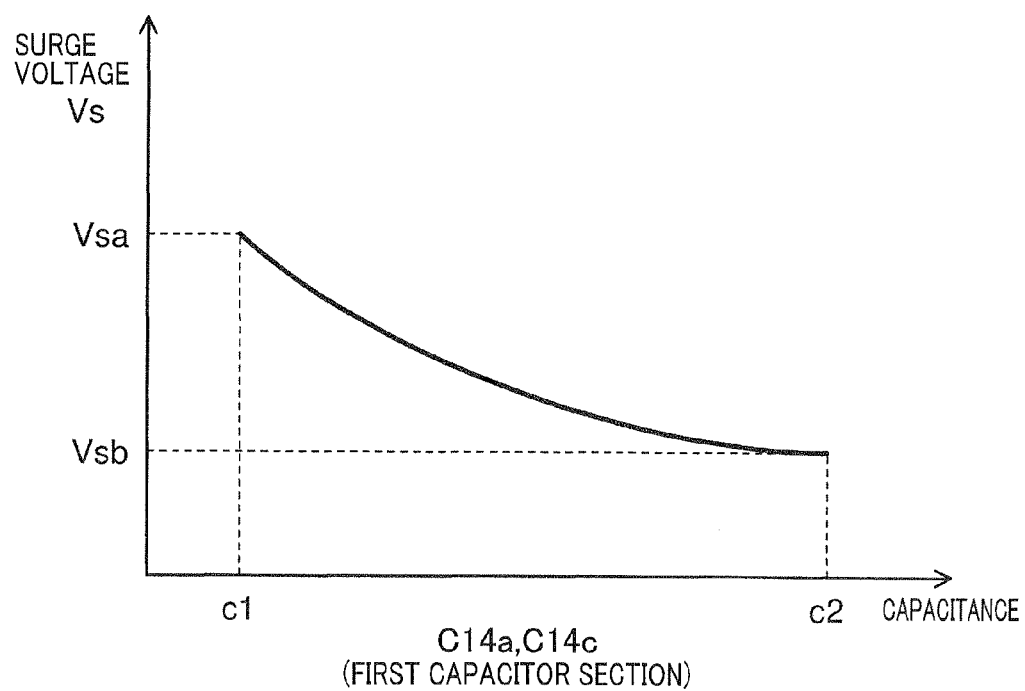
FIG. 7 is a graph of a relationship between surge voltage and capacitance of the first capacitor section.

The peak value of the fundamental wave f1 (surge voltage Vs) can be reduced by increasing the capacitance of the first capacitor sections C14a and C14c, as shown in FIG. 7. When the first capacitor sections C14a and C14c are set to capacitance c1, a surge voltage Vsa is generated. When the first capacitor sections C14a and C14c are set to capacitance c2, a surge voltage Vsb (Vsb<Vsa) is generated. When the capacitance increases, the current flowing to the first capacitor sections C14a and C14c increases. In accompaniment, the amount of generated heat increases, and power efficiency deteriorates. Therefore, according to the first embodiment, the capacitance of the first capacitor sections C14a and C14c is set to be small.

Figure 8:
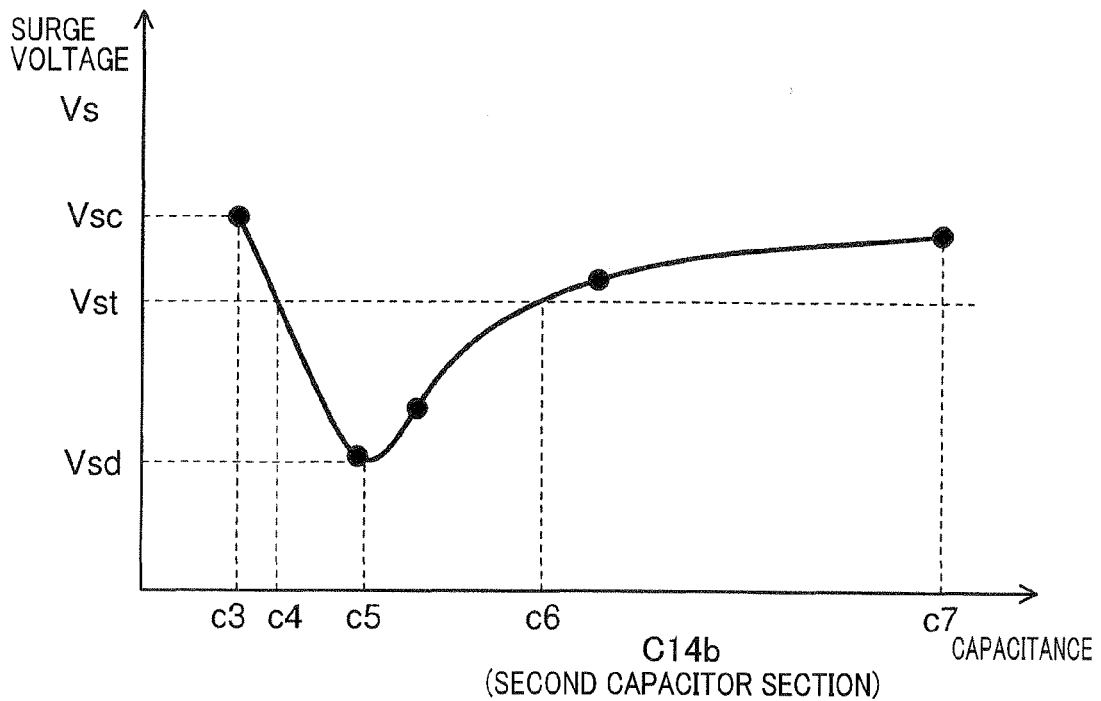
FIG. 8 is a graph of a relationship between surge voltage and capacitance of the second capacitor section.

On the other hand, the peak value of the third-order harmonic wave f2 (surge voltage Vs) increases and decreases depending on the second capacitor section C14b, as shown in FIG. 8. Even if the second capacitor section C14b is set to a small capacitance c3 or set to a large capacitance c7, the surge voltage Vs increases. However, when the second capacitor section C14b is set to a capacitance c5 (c3<c5<c7), the surge voltage Vs can be minimized. The capacitance c5 may be set within a range from capacitance c4 to capacitance c6 (c4<c5<c6) corresponding with a threshold Vst of the surge voltage Vs. As a result of this setting as well, the peak value of the surge voltage Vs can be reduced from that in the past.

Figure 9:
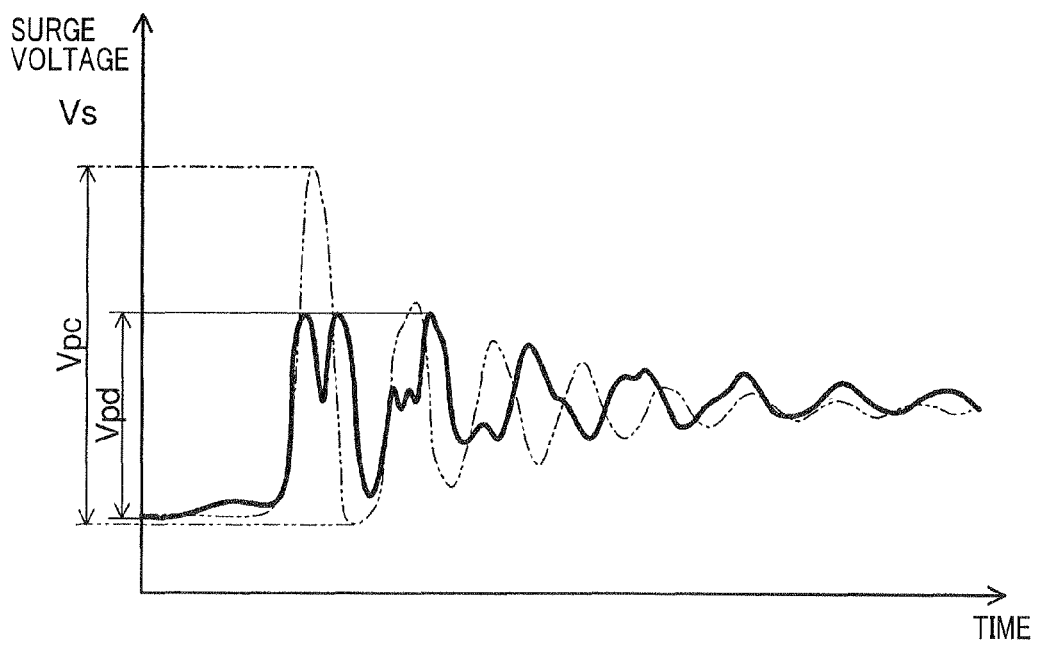
FIG. 9 is a graph of an example of changes over time in the surge voltage.

An example of changes over time in the surge voltage Vs is shown in FIG. 9. The changes over time in an instance in which the first capacitor sections C14a and C14c are provided and the second capacitor section C14b is not provided is indicated by the dashed double-dotted line. The changes over time in an instance in which the first capacitor sections C14a and C14c, and the second capacitor section C14b are both provided is indicated by the solid line. As is clear from FIG. 9, a peak value Vpd of the surge voltage Vs indicated by the solid line is less than a peak value Vpc of the surge voltage Vs indicated by the dashed double-dotted line (Vpd<Vpc).

According to the above-described first embodiment, the following effects can be achieved.

(1) The power supply device 10 is configured to include the first capacitor sections C14a and C14c, and the second capacitor section C14b (see FIG. 1). The first capacitor sections C14a and C14c are connected in parallel to the diodes D14a and D14c (rectifying elements). The diodes D14a and D14c are included in the rectifying section 14A. The second capacitor section C14b generates the third-harmonic wave f2 (one or more harmonic waves). The third-order harmonic wave f2 reduces the peak value Vpa of the fundamental wave f1 of the resonance that is generated based on the leakage inductance component of the transformer 13A and the capacitance component of the first capacitor sections C14a and C14c.

As a result of this configuration, one or more harmonic waves are generated by the second capacitor section C14b. The harmonic wave is combined with the fundamental wave f1. Therefore, the peak value Vpb of the composite wave f3 (surge voltage Vs) can be suppressed. The second capacitor section C14b is merely required to be provided separately from the first capacitor sections C14a and C14c. The respective capacitances of the first capacitor sections C14a and C14c and the second capacitor section C14b are not required to be increased. Therefore, efficiency maintenance and improvement can be achieved. Thus, heat generation in the first capacitor sections C14a and C14c and the second capacitor section C14b can be suppressed.

(3) The second capacitor section C14b is configured such that the capacitance is set such that the frequency of the fundamental wave f1 and the frequency of the third-order harmonic wave f2 (harmonic wave) is 1:3 (m=3) (see FIG. 8 and FIG. 9). As a result of this configuration, the fundamental wave f1 and the third-order harmonic wave f2 overlap and cancel each other. Therefore, the peak value of the combined composite wave f3 can also be reduced. As a result, the peak value of the surge voltage Vs can be significantly suppressed. According to the first embodiment, m is set to 3 (m=3). However, m can be set to any value as long as the value is an integer of 2 or more. Similar working effects can be achieved.

(4) The second capacitor section C14b is configured to be connected between the secondary-side terminal 13t2a (one end) and the secondary-side terminal 13t2d (other end) of the transformer 13A (see FIG. 1). As a result of this configuration, the third-order harmonic wave f2 (harmonic wave) of the resonance based on the leakage inductance that is present to some extent in the transformer 13A and the capacitance of the second capacitor section C14b is generated with certainty. The fundamental wave f1 and the third-order harmonic wave f2 overlap and cancel each other. Therefore, the peak value Vpc of the composite wave f3 (surge voltage Vs) can be suppressed with certainty (see FIG. 9).

(5) The power supply device 10 is configured to include either or both of: i) the plurality of first capacitor sections C14a and C14c that are connected in parallel; and ii) the plurality of second capacitor sections C14b that are connected in parallel (see FIGS. 2A to 2C, 3A, and 3B). As a result of this configuration, a large total capacitance of the first capacitor sections C14a and C14c and a large total capacitance of the second capacitor section C14b can be ensured. Therefore, heat generation can be suppressed.

(6) One or both of the first capacitor sections C14a and C14c, and the second capacitor section C14b are configured to have the plurality of capacitors Ca, Cb, Cc, Cd, and Ce that are connected in series (see FIGS. 2A to 2C, 3A, and 3B). As a result of this configuration, the respective capacitances of the capacitors Ca, Cb, Cc, Cd, and Ce can be kept small. The amount of current that flows can also be kept small. Therefore, efficiency maintenance and improvement can be achieved.

(7) The interconnected portion P2 that inter-connects the plurality of capacitors Ca, Cb, Cc, Cd, and Ce is configured to be formed having a larger area than the non-interconnected portions P1 and P2 excluding the section between the capacitors Ca, Cb, Cc, Cd, and Ce (see FIGS. 3A, 3B, and 4). As a result of this configuration, the interconnected portion P2 through which current flows in a concentrated manner can be formed having a large area. Therefore, heat dissipation is facilitated.

(8) The plurality of second capacitor sections C14b that are connected in parallel are configured such that a capacitance corresponding to the m-order harmonic wave (including the third-order harmonic wave f2) is set (see FIGS. 5A and 5B). As a result of this configuration, the peak value Vpb of the composite wave f3 can be further reduced by the third-order harmonic wave f2 that is overlapped with the fundamental wave f1. Even when a capacitance corresponding to an m-order harmonic wave other than the third-order harmonic wave f2 is set, similar working effects can be achieved.

(9) The capacitance of the second capacitor section C14b is configured to be set to be greater than the capacitance of the first capacitor sections C14a and C14c (see FIG. 8 and FIG. 9). As a result of this configuration, the peak value Vpb of the composite wave f3 can be further reduced by the peak of the third-order harmonic wave f2 and the peak of the fundamental wave f1 being overlapped and cancelled.

(10) The rectifying section 14A (diodes D14a and D14c) are configured by Schottky barrier diodes (see FIG. 1 and FIG. 9). As a result of this configuration, because the Schottky barrier diode has a characteristic in that reverse current does not flow, reverse current towards the transformer 13A can be prevented. The peak value Vpb of the composite wave f3 can be further reduced.

Second Embodiment

A second embodiment will be described with reference to FIG. 10. The configuration of the power supply device 10 and the like are similar to those according to the first embodiment. To simplify the drawings and description, differences from the first embodiment will be described in the second embodiment. Therefore, elements that are the same as the elements used in the first embodiment are given the same reference numbers. Descriptions thereof are omitted.

The second embodiment differs from the first embodiment regarding the configuration of the rectifying section 14. Specifically, the connection of the first capacitor sections C14a and C14c differs. According to the first embodiment, the first capacitor sections C14a and C14c are connected in parallel to the diodes D14a and D14c. However, according to the second embodiment, one side of each of the first capacitor sections C14a and C14c is connected to the common potential portion N.

Figure 10:
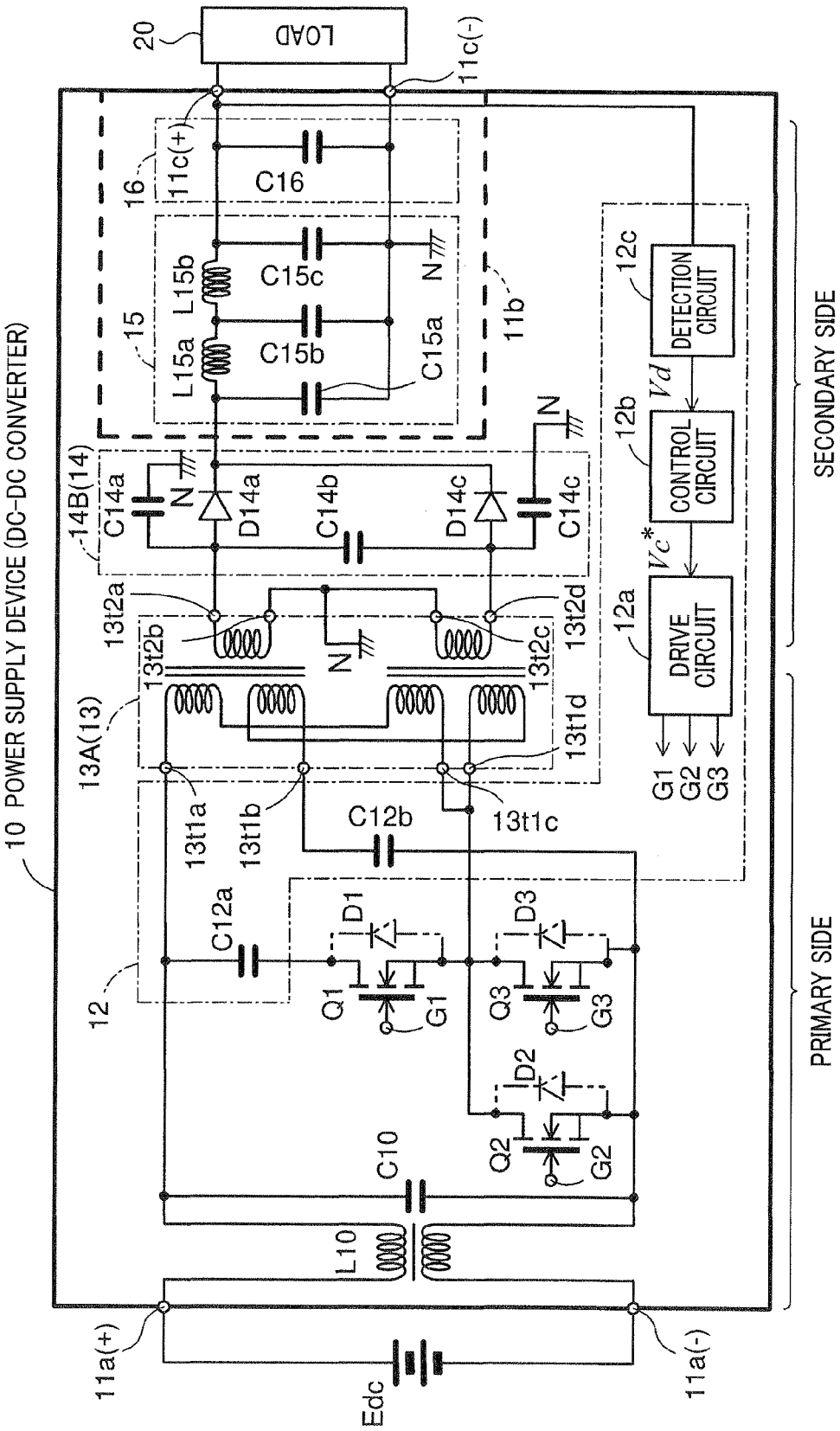
FIG. 10 is a circuit diagram schematically showing a second configuration example of the power supply device.

A rectifying section 14B in FIG. 10 is an example of the rectifying section 14. The rectifying section 14B is included instead of the rectifying section 14A shown in FIG. 1. The rectifying section 14B performs full-wave rectification. One end of the first capacitor section C14a is connected between the secondary-side terminal 13t2a (one end) of the transformer 13A and the diode D14a (anode side). The other end of the first capacitor section C14a is connected to the common potential portion N. One end of the first capacitor section C14c is connected between the secondary-side terminal 13t2d (one end) of the transformer and the diode D14c (anode side). The other end of the first capacitor section C14c is connected to the common potential portion N.

According to the above-described second embodiment, the following effects can be achieved. The configuration of the power supply device 10 other than the rectifying section 14B is similar to that according to the first embodiment. Therefore, working effects similar to (3) to (10), described in the first embodiment, can be achieved.

(2) The power supply device 10 is configured to include the first capacitor section C14a and C14c, and the second capacitor section C14b (see FIG. 10). One end of each of the first capacitor sections C14a and C14c is connected between one end of the transformer 13A and the rectifying section 14B. The other end of each of the first capacitor sections C14a and C14c is connected to the common potential portion N. The second capacitor section C14b generates the third-harmonic wave f2 (one or more harmonic waves). The third-order harmonic wave f2 reduces the peak value Vpa of the fundamental wave f1 of the resonance that is generated based on the leakage inductance component of the transformer 13A and the capacitance component of the first capacitor sections C14a and C14c.

As a result of this configuration, one or more harmonic waves are generated by the second capacitor section C14b. The harmonic wave is combined with the fundamental wave f1. Therefore, the peak value Vpb of the composite wave f3 (surge voltage Vs) can be suppressed. The second capacitor section C14b is merely required to be provided separately from the first capacitor sections C14a and C14c. The respective capacitances of the first capacitor sections C14a and C14c and the second capacitor section C14b are not required to be increased. Therefore, efficiency maintenance and improvement can be achieved. Thus, heat generation in the first capacitor sections C14a and C14c and the second capacitor section C14b can be suppressed.

Other Embodiments

The embodiments of the present invention are described above in the first and second embodiments. However the present invention is not limited in any way to the above-described embodiments. In other words, various embodiments are possible without departing from the spirit of the present invention. For example, the following embodiments may be actualized.

The above-described transformer 13A according to the first and second embodiments includes four coils (also referred to as windings; the same applies hereafter) on the primary side, and two coils on the secondary side (see FIG. 1 and FIG. 10).

Instead of this embodiment, a transformer 13 may be used that is configured to have a number of coils differing from that of the transformer 13A. For example, a transformer 13B shown in FIG. 11, FIG. 12, FIG. 14, and FIG. 15 is configured to include a single coil on both the primary side and the secondary side. A transformer 13C shown in FIG. 13 is configured to include two coils on the primary side and a single coil on the secondary side.

Figure 11:
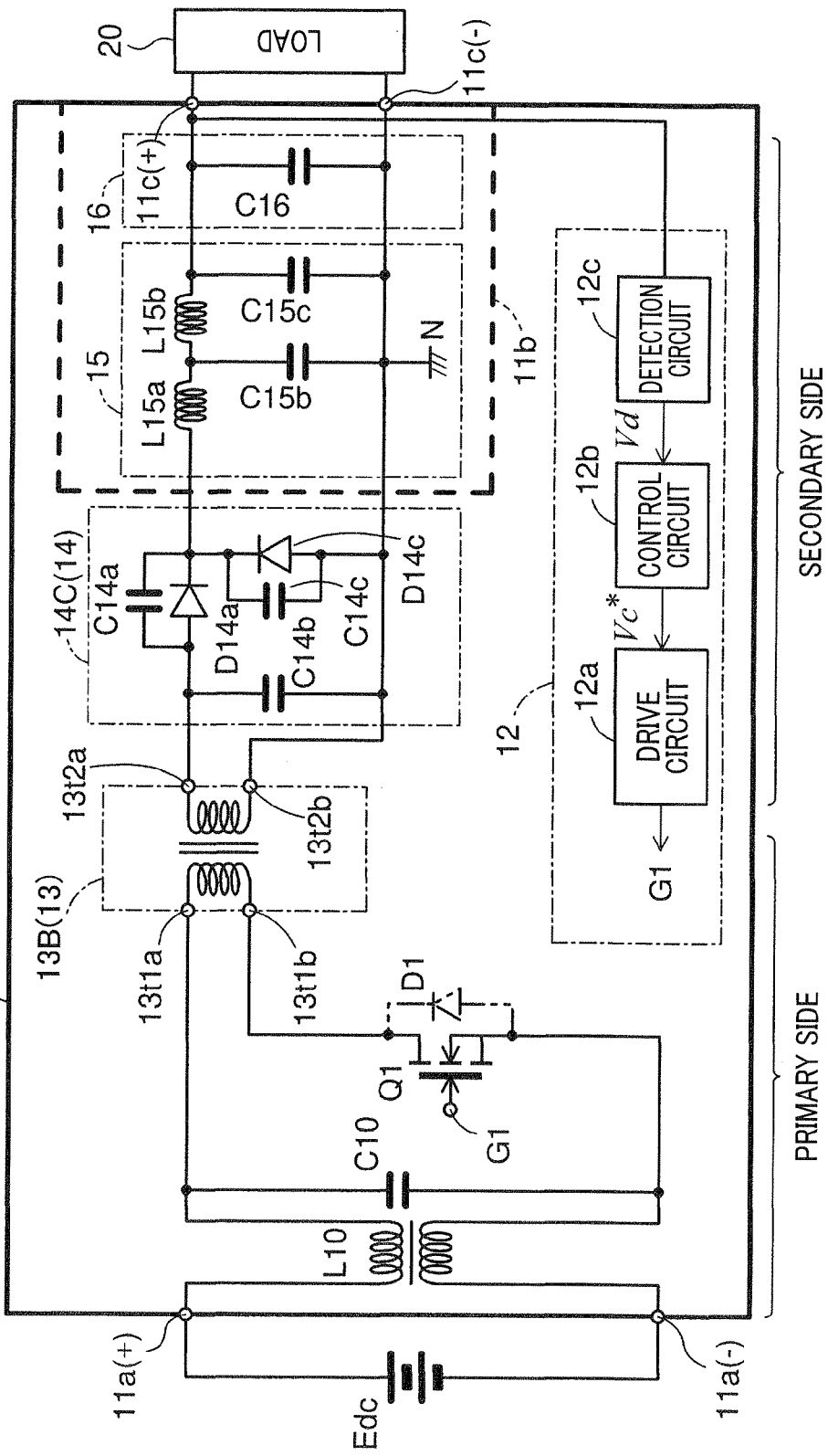
FIG. 11 is a circuit diagram schematically showing a third configuration example of the power supply device.
Figure 12:
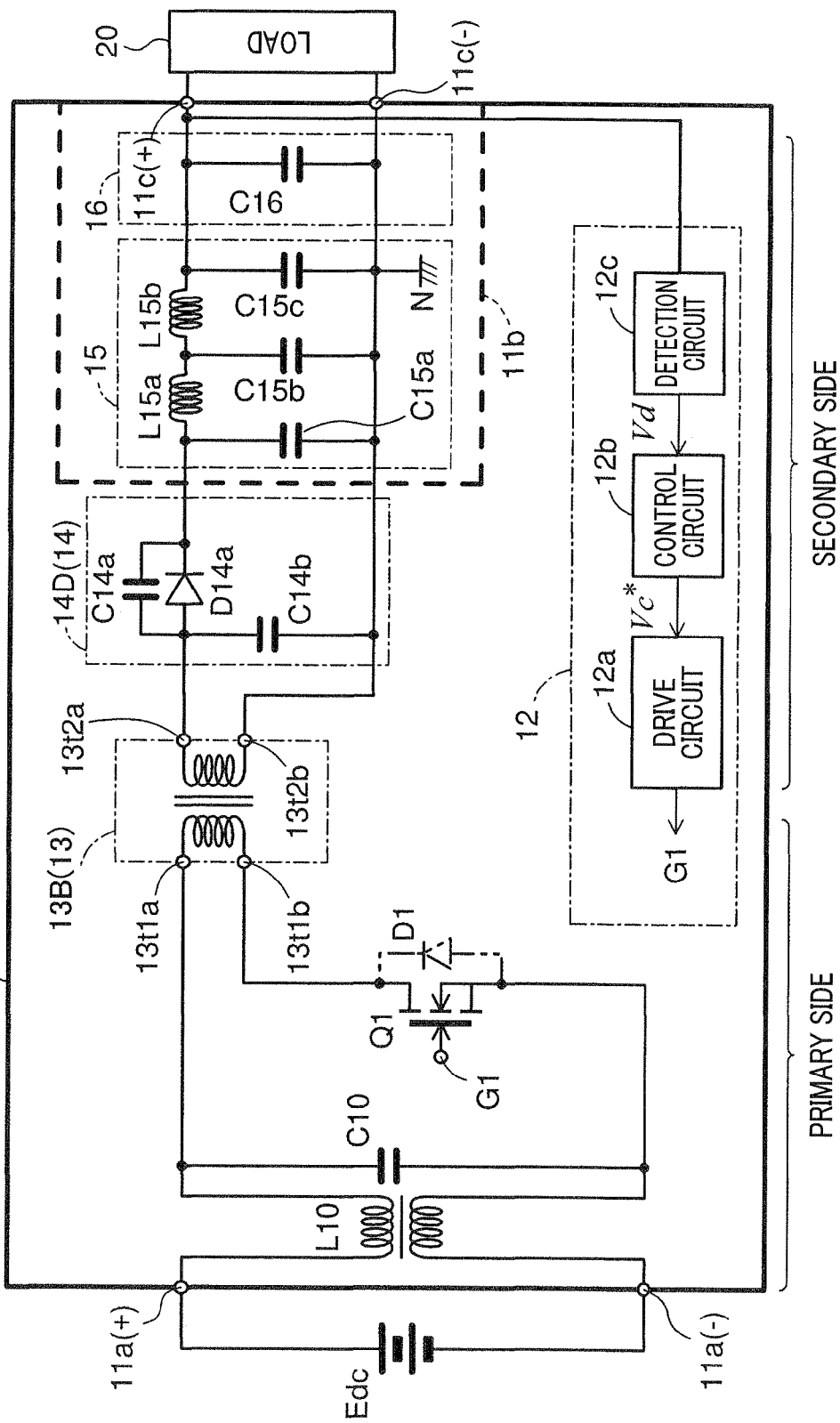
FIG. 12 is a circuit diagram schematically showing a fourth configuration example of the power supply device.
Figure 13:
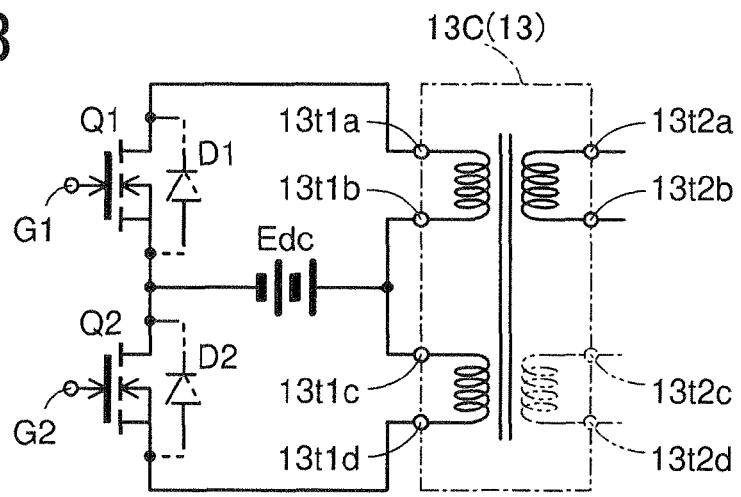
FIG. 13 is a circuit diagram schematically showing a second configuration example of the power converting section.

In an instance in which the transformers 13B and 13C shown in FIG. 11 to FIG. 14 are used, the rectifying section 14 is configured as a rectifying section 14C shown in FIG. 11, a rectifying section 14D shown in FIG. 12, or the like.

The rectifying section 14C shown in FIG. 11 provides a function for full-wave rectification. The rectifying section 14C includes the diodes D14a and D14c, the first capacitor sections C14a and C14c, the second capacitor section C14b, and the like. In the rectifying section 14A shown in FIG. 1 and FIG. 10, the anode of the diode D14c is not connected to the output connector 11c (− terminal). However, the rectifying section 14c in FIG. 11 differs in that the anode of the diode D14c is connected to the output connector 11c (− terminal).

The rectifying section 14D in FIG. 12 provides a function for half-wave rectification. The rectifying section 14D includes the diode D14a, the first capacitor section C14a, the second capacitor section C14b, and the like. The rectifying section 14D is the same as those according to the first and second embodiments in that the second capacitor section C14b is connected between the secondary-side terminals 13t2a and 13t2b of the transformer 13B (see FIGS. 1 and 10). However, the rectifying section 14D differs from those according to the first and second embodiments in that the secondary-side terminal 13t2b (one end) is connected to the common potential portion N.

Even when the configuration uses the rectifying section 14C or 14D, one or more harmonic waves are similarly generated by the second capacitor section C14b to reduce the peak value of the composite wave f3 (surge voltage Vs). Therefore, working effects similar to those according to the first and second embodiments can be achieved.

Figure 14:
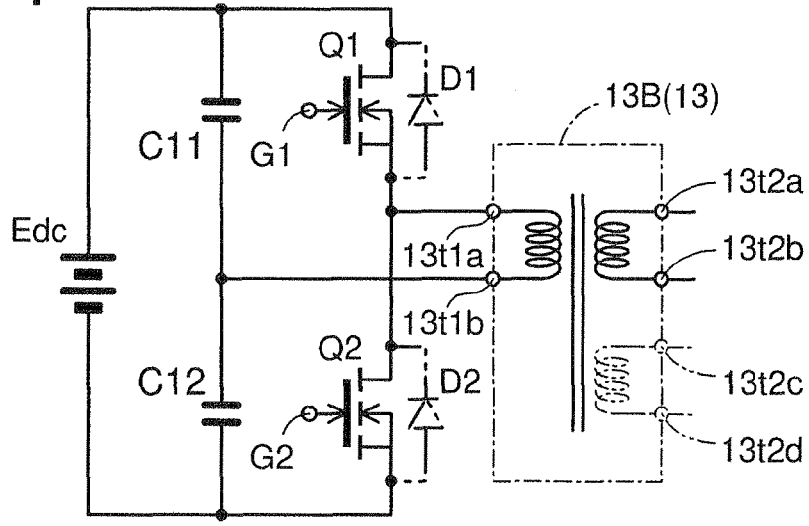
FIG. 14 is a circuit diagram schematically showing a third configuration example of the power converting section.
Figure 15:
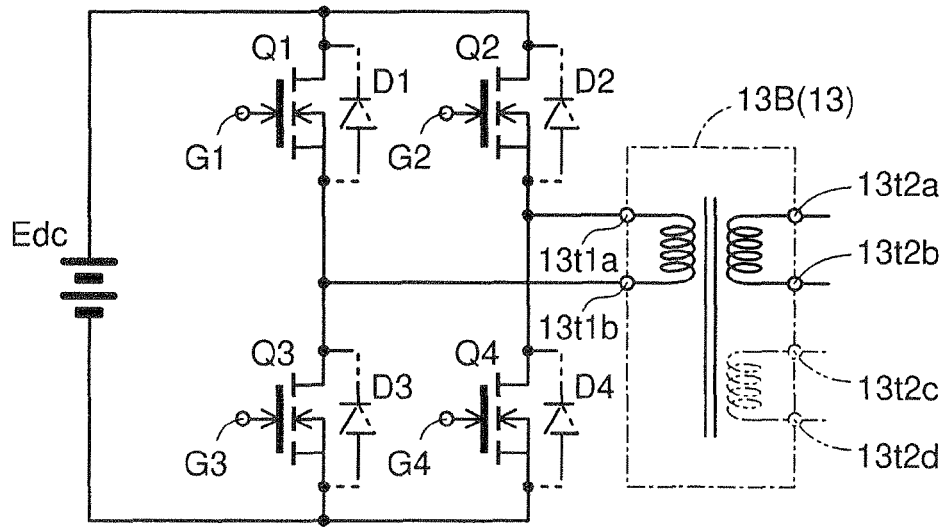
FIG. 15 is a circuit diagram schematically showing a fourth configuration example of the power converting section.

As in the transformer 13C shown in FIG. 13, and the transformer 13B shown in FIG. 14 and FIG. 15, a configuration is possible in which two coils are provided on the secondary side (indicated by solid lines and dashed double-dotted lines). The rectifying section 14 in this instance is configured in a manner similar to the rectifying section 14A shown in FIG. 1, the rectifying section 14B shown in FIG. 10, and the like. Therefore, working effects similar to those according to the first and second embodiments can be achieved.

The above-described substrate 12 according to the first and second embodiments is configured to have three switching elements Q1 to Q3 (see FIGS. 1 and 10). The switching elements Q1 to Q3 serve as the power converting section for converting direct-current power from the power source Edc to alternating-current power.

Instead of this embodiment, one or more switching elements may configure the power converting section. Depending on the number of switching elements, coils (inductors), capacitors, and the like may be included. Other configuration examples are shown in FIGS. 11 (12), 13, 14, and 15. In FIGS. 13 to 15, the choke coil L10 and the capacitor C10 are omitted.

The power converting sections shown in FIG. 11 and FIG. 12 are both examples in which the power converting section is configured by a single switching element Q1. The power converting section in FIG. 11 is referred to as a "single-forward type" because the rectifying section 14C is connected to the secondary side of the transformer 13B. The power converting section shown in FIG. 12 is referred to as a "flyback type" because the rectifying section 14D is connected to the secondary side of the transformer 13B. The drive circuit 12a transmits the drive signal to the control terminal G1 of the switching element Q1.

The power converting sections shown in FIG. 13 and FIG. 14 are an example in which the power converting section is configured by two switching elements Q1 and Q2.

The power converting section shown in FIG. 13 is referred to as a "push-pull type". The positive terminal of the power source Edc is connected to the primary-side terminals 13t1b and 12t1c of the transformer 13C. The negative terminal of the power source Edc is connected to the connecting point (intermediate point) of the switching elements Q1 and Q2 that are connected in series.

The power converting section shown in FIG. 14 is referred to as a "half-bridge type". The primary-side terminal 13t1a of the transformer 13B is connected to the connecting point (intermediate point) of the switching elements Q1 and Q2 that are connected in series. Similarly, the primary-side terminal 13t1b is connected to the connecting point (intermediate point) of the capacitors C11 and C12 that are connected in series. The drive circuit 12a individually transmits the drive signals to the control terminals G1 and G2 of the switching elements Q1 and Q2.

The power converting section shown in FIG. 15 is referred to as a "full-bridge type". The power converting section shown in FIG. 15 is an example in which the power converting section is configured by four switching elements Q1 to Q4. The primary-side terminal 13t1a of the transformer 13B is connected to the connecting point (intermediate point) of the switching elements Q2 and Q4 that are connected in series. Similarly, the primary-side terminal 13t1b is connected to the connecting point (intermediate point) of the switching elements Q1 and Q3 that are connected in series.

Compared to the half-bridge type power converting section shown in FIG. 14, two switching elements are used instead of two capacitors. The drive circuit 12a individually transmits drive signals to the control terminals G1 to G4 of the switching elements Q1 to Q4.

The secondary-side coil of the transformer 13 (13B and 13C) in the configurations shown in FIGS. 11 and 13 to 15 performs the transformer operation and does not perform the reactor operation. The filtering section 15 makes the coil L15a perform the reactor operation. Therefore, the capacitor C15a shown in FIG. 1 and FIG. 10 is not required.

The secondary-side coil of the transformer 13 (13B and 13C) in the configuration shown in FIG. 12 performs the transformer operation and the reactor operation in a manner similar to that of the transformer 13A according to the first and second embodiments. Therefore, the filtering section 15 requires the capacitor 15a to provide a function as a filter in a manner similar to that in FIGS. 1 and 10.

In this way, whether or not the capacitor C15a is required is determined depending on whether or not the transformer 13 also performs the reactor operation. Therefore, when the transformer 13 does not perform the reactor operation, the required capacitor C15a in the filtering section 15 can be eliminated, thereby reducing cost thereof.

As shown in FIG. 11 to FIG. 15, even when the power converting section is configured with differing numbers of elements, direct-current power from the power source Edc can be converted to alternating-current power. The primary-side circuit and the secondary-side circuit of the transformer 13 shown in FIG. 1 to FIG. 15 may be combined in any way. Therefore, working effects similar to those according to the first and second embodiments can be achieved.

According to the above-described first and second embodiments, the rectifying section 14 (14A and 14B) is configured to have two diodes D14a and D14c to perform full-wave rectification (see FIGS. 1 and 10). The rectifying section 14D shown in FIG. 12 is configured to have a single diode D14a to perform half-wave rectification.

Instead of these embodiments, the rectifying section 14 may be configured by other rectifying sections 14 that perform full-wave rectification and half-wave rectification. An example of another rectifying section 14 that performs full-wave rectification is shown in FIG. 16.

Figure 16:
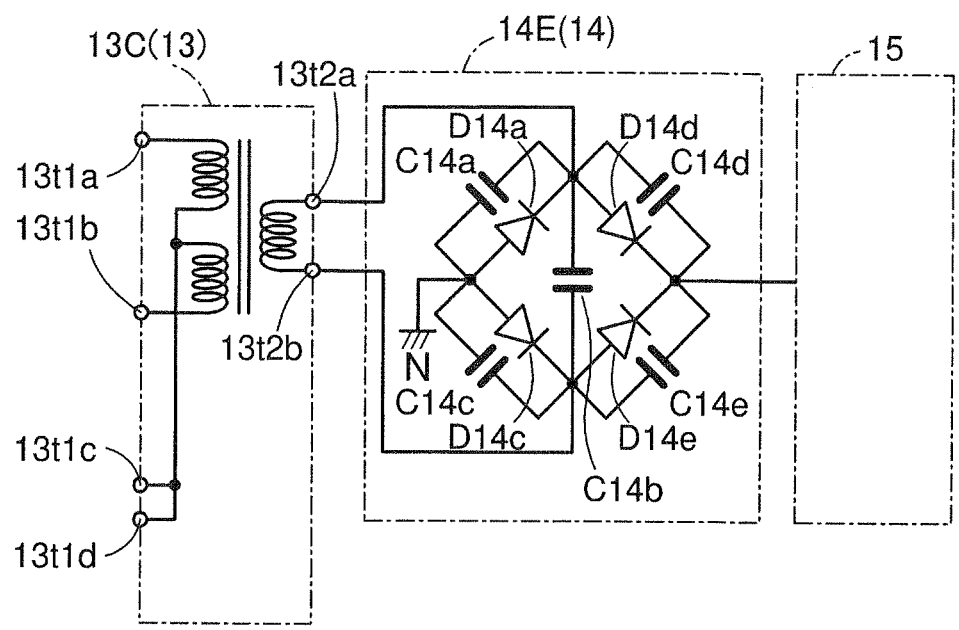
FIG. 16 is a circuit diagram schematically showing a second configuration example of the rectifying section.

A rectifying section 14E shown in FIG. 16 includes diodes D14a, D14c, D14d, and D14e, first capacitor sections C14a, C14c, C14d, and C14e, the second capacitor section C14b, and the like. The diodes D14a, D14c, D14d, and D14e form a diode bridge. The first capacitor sections C14a, C14c, C14d, and C14e are each connected in parallel to the corresponding diodes D14a, D14c, D14d, and D14e. This similarly applies in instances in which the rectifying section 14 is configured by other rectifying circuits.

In these configurations as well, the second capacitor section C14b similarly generates one or more harmonic waves to reduce the peak value of the composite wave f3 (surge voltage Vs). Therefore, working effects similar to those according to the first and second embodiments can be achieved.

According to above-described first and second embodiments, the diodes D14a and D14c are used as the rectifying elements (rectifiers) (see FIGS. 1 and 10). Instead of the diodes, embodiment, other rectifying elements may be used, as needed. As other rectifying elements, for example, transistors (including FET and IGBT) and thyristors are applicable. Two or more types of rectifying elements may be combined, because the types of rectifying elements merely differ, working effects similar to those according to the first and second embodiments can be achieved.

According to the above-described first and second embodiments, the rectifying section 14 is configured to include the first capacitor sections C14a and C14c and the second capacitor section C14b. The filtering section 15 is configured to include the capacitors C15a, C15b, and C15c. The output stabilizing section 16 is configured to include the capacitor C16 (see FIGS. 3 and 6). These sections 14a, 14b, 15, and 16 may include any type of capacitors. The number of capacitors in each section is not limited to that of the first and second embodiments. One or more capacitors may be used in each section. In this case, one or more capacitors can operate in a manner equivalent to the first and second embodiments. Therefore, working effects similar to those according to the first and second embodiments can be achieved.

According to the above-described first and second embodiments, the filtering section 15 is configured to include the coils L15a and L15b (see FIGS. 3 and 6). Instead of this configuration, a configuration is possible in which one or more coils are replaced with reactors. Even when the reactor is used, the reactor operates in a manner equivalent to the coil. Therefore, working effects similar to those according to the first and second embodiments can be achieved.

What is claimed is:

1. A power supply device that includes: a substrate that includes at least a semiconductor element; a transformer; a rectifying section that performs rectification; and a filtering section that reduces alternating-current components, the power supply device comprising:
a first capacitor section that is connected in parallel to a rectifying element included in the rectifying section; and
a second capacitor section that is connected between one end and the other end of the transformer, generates one or more harmonic waves that reduce a peak value of a fundamental wave of resonance generated based on a leakage inductance component of the transformer and a capacitance component of the first capacitor section, wherein the second capacitor section comprises a plurality of capacitors, the plurality of capacitors are connected with each other using a serial connection, a parallel connection, or a combination of a serial connection and a parallel connection, and the second capacitor section includes an interconnected portion that interconnects the plurality of capacitors, the interconnected portion having an area greater than an area of one end side of the second capacitor section or an area of the other end side of the second capacitor section.

2. The power supply device according to claim 1, wherein the second capacitor section is set such that a ratio of a frequency of the fundamental wave to a frequency of the harmonic wave is 1:n, where n is an integer of 2 or more.

3. The power supply device according to claim 1, wherein the first capacitor section comprises a plurality of capacitors, and the plurality of capacitors of the first capacitor section are connected with each other using a serial connection, a parallel connection, or a combination of a serial connection and a parallel connection.

4. The power supply device according to claim 3, wherein the plurality of capacitors of the first capacitor section are connected in series with one another, each of the capacitors of the first capacitor section is set to have a capacitance that is based on each m-order harmonic wave, where m is an integer of 2 or more.

5. The power supply device according to claim 1, wherein a capacitance of the second capacitor section is set to be larger than a capacitance of the first capacitor section.

6. The power supply device according to claim 1, wherein the rectifying section comprises a Schottky barrier diode.

7. The power supply device according to claim 1, wherein the transformer is configured not to operate as a reactor.

8. A power supply device that includes: a substrate that includes at least a semiconductor element; a transformer; a rectifying section that performs rectification; and a filtering section that reduces alternating-current components, the power supply device comprising:

a first capacitor section of which one end is connected between one end of the transformer and the rectifying section, and the other end is connected to a common potential portion; and a second capacitor section that is connected between one end and the other end of the transformer, generates one or more harmonic waves that reduce a peak value of a fundamental wave of resonance generated based on a leakage inductance component of the transformer and a capacitance component of the at least one first capacitor section, wherein the second capacitor section comprises a plurality of capacitors, the plurality of capacitors are connected with each other using a serial connection, a parallel connection, or a combination of a serial connection and a parallel connection, and the second capacitor section includes an interconnected portion that interconnects the plurality of capacitors, the interconnected portion having an area greater than an area of one end side of the second capacitor section or an area of the other end side of the second capacitor section.

9. The power supply device according to claim 8, wherein the second capacitor section is set such that a ratio of a frequency of the fundamental wave to a frequency of the harmonic wave is 1:n, where n is an integer of 2 or more.

10. The power supply device according to claim 8, wherein the first capacitor section comprises a plurality of capacitors, and the plurality of capacitors are connected with each other using a serial connection, a parallel connection, or a combination of a serial connection and a parallel connection.

11. The power supply device according to claim 10, wherein the plurality of capacitors of the first capacitor section are connected in series with one another, each of the capacitors of the first capacitor section is set to have a capacitance that is based on each m-order harmonic wave, where m is an integer of 2 or more.

12. The power supply device according to claim 8, wherein a capacitance of the second capacitor section is set to be larger than a capacitance of the first capacitor section.

13. The power supply device according to claim 8, wherein the rectifying section comprises a Schottky barrier diode.

14. The power supply device according to claim 8, wherein the transformer is configured not to operate as a reactor.

* * * * *